United States Patent
Ishii et al.

(10) Patent No.: US 7,751,820 B2
(45) Date of Patent: Jul. 6, 2010

(54) HANDOFF METHOD COMPRISING NETWORK CONTROL APPARATUS THAT RECEIVES DATA PACKETS FROM BOTH THE CORE NETWORK AND THE OTHER NETWORK CONTROL APPARATUS WHEREIN SAID RECEIVED DATA PACKETS WILL BE TRANSFORMED INTO WIRELESS DATA

(75) Inventors: Hidenori Ishii, Tokyo (JP); Kenji Takagi, Cupertino, CA (US)

(73) Assignee: Panasonic Corporation, Osaka (JP)

( * ) Notice: Subject to any disclaimer, the term of this patent is extended or adjusted under 35 U.S.C. 154(b) by 534 days.

(21) Appl. No.: 11/628,046

(22) PCT Filed: Mar. 17, 2005

(86) PCT No.: PCT/JP2005/004797

§ 371 (c)(1),
(2), (4) Date: Nov. 30, 2006

(87) PCT Pub. No.: WO2005/120119

PCT Pub. Date: Dec. 15, 2005

(65) Prior Publication Data
US 2008/0019338 A1 Jan. 24, 2008

(30) Foreign Application Priority Data
Jun. 3, 2004 (JP) .............................. 2004-166120

(51) Int. Cl.
*H04W 36/00* (2009.01)
(52) U.S. Cl. ...................... 455/439; 455/436; 455/437; 455/438
(58) Field of Classification Search .................. 370/331
See application file for complete search history.

(56) References Cited

U.S. PATENT DOCUMENTS 6,574,475 B1 6/2003 Suzuki (Continued)

FOREIGN PATENT DOCUMENTS

JP 2000-69532 3/2000

(Continued)

*Primary Examiner*—Nick Corsaro
*Assistant Examiner*—Munsoon Choo
(74) *Attorney, Agent, or Firm*—Wenderoth, Lind & Ponack, L.L.P.

(57) ABSTRACT

There are a wireless access network comprising a radio network gateway apparatus (101), radio access network control apparatus (102*a*), (102*b*) and a base stations (103*a*), (103*b*) and a terminal (104) accommodated in the wireless access network and when the terminal (104) enters into a new cell B, a packet data is transmitted from the source radio access network control apparatus (102*a*) to the target radio access network control apparatus (102*b*). Further, when the terminal (104) switches the radio access network control apparatus (102) with which the terminal (104) communicates, the target radio access network control apparatus (102*b*) switches a transmission line of a data to be transmitted to the terminal (104) from a wireless data to a packet data in the source radio access network control apparatus (102*a*), and from the source packet data to a target packet data in a synchronized manner at each timing. This reduces traffic which occurs when switching a radio access network control apparatus to be communicated while the terminal moves between cells and prevent packet interruption in a wireless access network providing packet transmission service.

5 Claims, 9 Drawing Sheets

U.S. PATENT DOCUMENTS

| | | |
|---|---|---|
| 6,687,249 B1 | 2/2004 | Noguera-Rodriguez et al. |
| 6,807,421 B1 | 10/2004 | Ahmavaara |
| 2004/0085926 A1 | 5/2004 | Hwang et al. |
| 2004/0125795 A1* | 7/2004 | Corson et al. ............... 370/356 |
| 2005/0147042 A1* | 7/2005 | Purnadi et al. ............... 370/236 |

FOREIGN PATENT DOCUMENTS

| | | |
|---|---|---|
| JP | 2002-510917 | 4/2002 |
| JP | 2002-523996 | 7/2002 |
| JP | 2003-111148 | 4/2003 |
| JP | 2004-135292 | 4/2004 |

* cited by examiner

HANDOFF METHOD COMPRISING NETWORK CONTROL APPARATUS THAT RECEIVES DATA PACKETS FROM BOTH THE CORE NETWORK AND THE OTHER NETWORK CONTROL APPARATUS WHEREIN SAID RECEIVED DATA PACKETS WILL BE TRANSFORMED INTO WIRELESS DATA

TECHNICAL FIELD

The present invention relates to a method of switching radio access network control apparatus which maintains a communication when a terminal moves between cells while, for example, a service using multicast is provided in a wireless access network of a mobile communication system.

BACKGROUND ART

Currently, mobile telephones have been found in the fields that require more bandwidth such as access to WWW and videophone in addition to audio. There is increasing demand for bandwidth. In response to this, so-called third generation schemes such as W-CDMA (Wideband Code Division Multiple Access) and MC-CDMA (Multicarrier CDMA) schemes are being introduced. Further, MBMS (Mobile Broadcast/Multicast Service) providing a multicast service are being standardized in 3GPP (3rd Generation Partnership Project).

FIG. 7 shows a configuration of a W-CDMA wireless access network according to the prior art. This configuration is disclosed, for example, in Japanese Patent Laid-Open No. 2003-111148. Specifications for MBMS are described in 3GPP TS22.146, TS23.846, TS25.346, TS25.992.

In FIG. 7, BM-SC 701 (Broadcast/Multicast Service Controller) is a service control apparatus for controlling the MBMS.

GGSN 702 (Gateway GPRS Support Node) is a GPRS gateway apparatus for relaying a GPRS packet. SGSN 703 (Serving GPRS Suppose Node) controls GPRS. A radio network gateway apparatus 708 is a gateway between a core network and radio access network control apparatus 704a, 704b and relays a data packet between the SGSN 703 and the radio access network control apparatus 704a, 704b. The GGSN 702, the SGSN 703, the radio network gateway apparatus 708 and the radio access network control apparatus 704 relay a data packet such as MBMS. These are collectively referred to herein as a "data packet gateway apparatus".

The first and the second radio access network control apparatus 704a, 704b control respective wireless access networks. In the following description, the first and second radio access network control apparatus 704a, 704b are collectively referred to as a radio access network control apparatus 704. The radio access network control apparatus may be abbreviated by RNC. First and second base stations 705a, 705b are base stations for transforming a signal in a wired access network and a wireless data and transmitting and receiving the signal and the data. In the following description, the first and second base stations 705a, 705b are collectively referred to as a base station 705. The terminal 706 performs wireless communication. Cells A, B indicate ranges in which signals from the first and second base stations 705a, 705b can arrive respectively, that is, the first and second base stations 705a, 705b can communicate with the terminal 706 respectively.

MBMS is a service for transmitting to the terminal via the GGSN 702, the SGSN 703 and the wireless access network in one-way direction a packet inputted by a content provider or the like from another IP network to the BM-SC 701. In order to reduce traffic flowing through the core network or the wireless access network, a packet is not transmitted from SGSN 703 which is not in RA (Routing Area) to the radio access network control apparatus 704.

In FIG. 7, it is assumed that the radio access network control apparatus 704 and the base station 705 are integrally deployed and one radio access network control apparatus 704 is deployed for each cell. Typically, in wireless access networks, tens of base stations are deployed under a radio access network control apparatus. Therefore, by reducing traffic at an interface between the radio access network control apparatus and the base stations, communication cost is expected to be effectively reduced.

However, whether or not the MBMS can transmit a packet is determined for each radio access network control apparatus 704. Therefore, if one of a plurality of base stations 705 connected to the radio access network control apparatus 704 has a terminal 706 receiving the MBMS, an MBMS packet is transmitted to a plurality of base station connected to the radio access network control apparatus even when those base stations 705 do not have any terminal 706 receiving the MBMS. This transmitted MBMS packet is not used in an actual service.

By miniaturizing the radio access network control apparatus 704 and locating the radio access network control apparatus 704 and the base station 705 at the same location as shown in FIG. 7, it is expected that transmission of an MBMS packet to unneeded base stations 705 is prevented and traffic in the wireless access network is reduced. However, if the radio access network control apparatus 704 is simply miniaturized, the range, where radio access network control apparatus 704 can communicate with the terminal, is reduced. Therefore, when the terminal 706 is moved, the radio access network control apparatus 704 with which the terminal 706 communicates is frequently switched. As shown in FIG. 7, in order to reduce the impact of miniaturization of the radio access network control apparatus 704 to a node in the core network such as the SGSN 703, the radio network gateway apparatus 708 is deployed. When relaying a packet transmission or switching the radio access network control apparatus 704 communicating with the terminal 706, the radio network gateway apparatus 708 operates similar to the SGSN 703, thereby reducing the switching frequency. In the following operation, the process of the radio network gateway apparatus 708 may alternatively be performed by the SGSN 703.

FIG. 8 shows an example of a processing sequence when the terminal 706 is moved. The present explanation deals with packet transmission providing the MBMS in a wireless access network only. In FIG. 8, the BM-SC 701, GGSN 702 and the base station 704 are omitted from the overall configuration diagram in FIG. 7 for simplicity. In FIG. 8, outline arrows denote flows of packet data and shaded arrows denote flows of wireless data. In the prior art, the base station is only responsible for transmitting dedicated channel transformed by the radio access network control apparatus.

In the MBMS, although either multicast in which a plurality of nodes in a wireless access network can receive the same packet or unicast in which a packet is individually received for each node can be selected as a transport layer in the wireless access network, the present invention assumes that unicast is selected.

In FIG. 8, the terminal 706 first establishes a dedicated channel with the first radio access network control apparatus 704a. In this case, the first radio access network control apparatus 704a is a Serving RNC for controlling wireless communication such as RRC in the terminal 706. This dedicated channel transmits data from the SGSN 703 to the terminal 706 via the radio network gateway apparatus 708 and the first radio access network control apparatus 704a. A data which is transmitted toward the terminal 706 is transmitted as a packet data up to the first radio access network control apparatus 704a. The data is transmitted as a wireless data from the first radio access network control apparatus 704a to the terminal 706. The packet data is assumed to be a data transmitted as GTP (GPRS Tunneling Protocol) packets. The wireless data is assumed to be a logical channel defined at MAC layer such as DTCH (Dedicated Traffic Channel) or MTCH (MBMS point-to-multipoint Traffic Channel) in a W-CDMA wireless access network. In 3GPP standards, a transport channel, a physical channel or the like generated from transforming a logical channel in the radio access network control apparatus 704 and the base station 705 is transmitted synchronously on a frame basis. The present invention is also applicable to the case where these are wireless data.

At event 802, the terminal 706 enters into the cell B and can communicate with both the first base station 705a and the second base station 705b. The terminal 706 outputs a power measurement report 803 including a report of a signal for the second radio access network control apparatus 704b to the first radio access network control apparatus 704a.

On the other hand, the second radio access network control apparatus 704b also detects that the terminal 706 can communicate with the terminal 706 (although the first radio access network control apparatus 704a is operating as a Serving RNC). The radio access network control apparatus which can communicate with the terminal 706 but does not control the wireless communication is referred to as a Drift RNC. Since the terminal 706 receiving MBMS is under control, the second radio access network control apparatus 704b performs MBMS registration process 804 for adding itself to targets for transmitting MBMS (3GPP TS25.346: MBMS Registration procedure, hereinafter the Technical Specification (TS) or Technical Report (TR) number in 3GPP and the name of the message or procedure is noted within parenthesis) along with the radio network gateway apparatus 708. Further, the radio network gateway apparatus 708 performs an MBMS session initiation process 805 (3GPP TS25.346: MBMS Session Start) with respect to the second radio access network control apparatus 704b. This allows the radio network gateway apparatus 708 to transmit a packet such as a signal 806.

On the other hand, when the first radio access network control apparatus 704a receives the power measurement report 803 for the second base station 705b from the terminal 706, the first radio access network control apparatus 704a adds the cell B to Active Set indicating cells with which the terminal 706 communicates. In this case, a process similar to the communication using the dedicated channel is performed. The dedicated channel data processed at the first radio access network control apparatus 704a is transmitted using a communication channel between the first radio access network control apparatus 704a and the second radio access network control apparatus 704b and the transmitted data is transmitted to the terminal 706 via the second radio access network control apparatus 704b and the second base station 705b.

First, in order to establish a dedicated channel of the first radio access network control apparatus 704a with the second radio access network control apparatus 704b, a radio link addition process 807 (3GPP TS25.423: Radio Link Addition procedure) is performed. This initiates transmitting the dedicated channel data from the first radio access network control apparatus 704a to the second radio access network control apparatus 704b as shown by a signal 808.

The second radio access network control apparatus 704b performs a process 809 for establishing a channel with the terminal 706 (3GPP TS25.331: Active Set Update procedure). The terminal 706 simultaneously communicates with the both the first and second base stations 705a, 705b. This reduces the possibility of disconnecting the communication due to a change in a circumstance of the wireless network.

Next, at event 811, the first radio access network control apparatus 704a primarily controlling the terminal 706 (operating as the Serving RNC) determines switching of the radio access network control apparatus (3GPP SRNS Relocation in UTRAN). First, the first radio access network control apparatus 704a out-puts an RNC switching preliminary notification 812 to the radio network gateway apparatus 708 (3GPP TS25.423: Relocation Required).

The radio network gateway apparatus 708 requests switching of the radio access network control apparatus from the first radio access network control apparatus 704a by an RNC switching request/response procedure 813. In response to this, the first radio access network control apparatus 704a outputs an RNC switching execution request 814 including the dedicated channel to be switched and context information such as the sequence number of a PDCP packet where switching timing occurs (3GPP TS25.423: Relocation Commit) to the target second radio access network control apparatus 704b.

In response to the RNC switching execution request 814, the second radio access network control apparatus 704b notifies the radio network gateway apparatus 708 of a RNC switching detection notification 815 indicating detection of the switching execution request (3GPP TS25.413: RELOCATION DETECT) and performs switching of the dedicated channel. After switching, the second radio access network control apparatus 704b outputs the RNC switching completion notification 816 (3GPP TS25.413: RELOCATION COMPLETE) to the radio network gateway apparatus 708.

DISCLOSURE OF THE INVENTION

When the terminal 706 is moved, handover occurs and if the target cell is added to the Active Set, the dedicated channel is transmitted from the source RNC. At this point, since the radio access network control apparatus 704a, 704b having the target cell simultaneously register with the SGSN 703, an MBMS packet signal is transmitted from the SGSN 703 to the radio access network control apparatus 704a, 704b. However, since traffic of the MBMS packet signal is not transmitted to the terminal 706, extra traffic flows through long distance between the SGSN 703 and the radio access network control apparatus 704b. Therefore, it is required to reduce traffic between the SGSN 703 and the radio access network control apparatus 704b and reduce line cost.

Also, it is required to prevent data interruption during switching from a packet data transmitted from the source radio access network control apparatus 704a to a packet data transmitted from the SGSN 703. In 3GPP, if RLC Acknowledge Mode is used, a procedure for switching a radio access network control apparatus without loss by retransmitting a data which was not transmitted correctly is provided. However, if RLC Transparent Mode or Unacknowledge Mode is used, the 3GPP scheme can not be applied. In MBMS, applications to streaming is also assumed, and in this case, the data retransmission in the above procedure for switching a radio access network control apparatus does not result in an increase of the quality of audio and movie transmitted as streaming, therefore another mode different from Acknowledge Mode may be used.

In the example of the prior art, since a data transmitted from the SGSN 703 to the target radio access network control apparatus 704b does not pass through the source radio access network control apparatus 704a, the amount of delay of the data is expected to be less than a data transmitted via the source radio access network control apparatus 704a by D packets, so that data interruption occurs. If the source radio access network control apparatus 704a performed switching at sequence number N, when the packet of the sequence number N arrived at the target radio access network control apparatus 704b, the sequence number of a packet form the SGSN is N+D. Therefore, the radio access network control apparatus 704b can not determine whether or not transmission of the packets of the sequence number N+1 to N+D−1 may fail, or the packets of the sequence number N+1 to N+D−1 have been transmitted to the terminal 706.

In a method of storing packets from the SGSN for a certain period in a buffer and transmitting the stored packets sequentially to the terminal after switching, some buffer size is required to reduce loss during switching. However, increasing the buffer size may waste resources in the radio access network control apparatus. In the above patent document, the buffer size is appropriately determined according to the communication circumstance. That is, delay time is measured between the source and target radio access network control apparatus and the buffer size is then determined based on the measured delay time in the target radio access network control apparatus. However, since it is required to start the measurement after the terminal is moved in order to measure appropriate delay time, the communication may be disconnected due to delay resulting from the measurement. Further, in case of streaming, when overhead occurs in a communication between the source and target radio access network control apparatus, the transmission data is interrupted.

In view of the foregoing, it is an object of the present invention to provide communication means in a wireless access network providing a multicast service in which interruption does not occur during a terminal is moved between cells while reducing the traffic amount.

In one aspect of the present invention, a radio access network control method for controlling radio access network comprising radio access network control apparatus for transforming a data packet received from a core network to a wireless data and transmitting the wireless data to a portable terminal, and the portable terminal for receiving the wireless data from the radio access network control apparatus, comprises the steps of: detecting the entrance of the portable terminal which is receiving the wireless data from radio access network control apparatus into an area in which the portable terminal can communicate with another radio access network control apparatus, wherein the another radio access network control apparatus is different from the radio access network control apparatus; transmitting the wireless data from the radio access network control apparatus to the another radio access network control apparatus, wherein the wireless data is transformed at the radio access network control apparatus; transmitting the wireless data from the another radio access network control apparatus to the portable terminal, wherein the wireless data is received at the another radio access network control apparatus from the radio access network control apparatus; and transmitting the data packet from the radio access network control apparatus to the another radio access network control apparatus, wherein the data packet is received at the radio access network control apparatus from the core network.

In another aspect of the present invention, the radio access network control method may comprise the step of transmitting a message from the another radio access network control apparatus to a data packet gateway apparatus, wherein the message indicates that a data packet is being received from the radio access network control apparatus.

In another aspect of the present invention, the radio access network control method may comprise the steps of: transforming the data packet to the wireless data at the another radio access network control apparatus, wherein the data packet is received from the radio access network control apparatus; switching at the another radio access network control apparatus from the wireless data received from the radio access network control apparatus to the wireless data obtained from the transformation as the wireless data to be transmitted to the portable terminal; receiving a data packet at the another radio access network control apparatus from the core network; and switching at the another radio access network control apparatus from the data packet received from the radio access network control apparatus to the data packet received from the core network with synchronizing both data packets as the data packet to be used in the transformation.

In another aspect of the present invention, the radio access network control method may comprise the step of stopping transmitting the data packet from the radio access network control apparatus to the another radio access network control apparatus, after the another radio access network control apparatus has started transmitting the wireless data to the portable terminal using the data packet from the core network.

In another aspect of the present invention, a radio access network control system comprises a radio access network control apparatus for transforming a data packet received from a core network to a wireless data and transmitting the wireless data to a portable terminal, and the portable terminal for receiving the wireless data from the radio access network control apparatus, wherein: when the portable terminal which is receiving the wireless data from radio access network control apparatus enters into an area in which the portable terminal can communicate with another radio access network control apparatus being different from the radio access network control apparatus, the radio access network control apparatus transmits the wireless data to the another radio access network control apparatus, wherein the wireless data is transformed by the radio access network control apparatus, the another radio access network control apparatus transmits the data received from the radio access network control apparatus to the portable terminal and the radio access network control apparatus transmits the data packet to the another radio access network control apparatus, wherein the data packet is received from the core network.

In another aspect of the present invention, the radio access network control system wherein: the another wireless network may transform the data packet received from the radio access network control apparatus to the wireless data, the another radio access network control apparatus may switch from the wireless data received from the radio access network control apparatus to the wireless data obtained from the transformation as the wireless data to be transmitted to the portable terminal, the another radio access network control apparatus may receive a data packet from the core network, and the another radio access network control apparatus may switch from the data packet received from the radio access network control apparatus to the data packet received from the core network with synchronizing both data packets as the data packet to be used in the transformation.

In another aspect of the present invention, a radio access network control apparatus comprises means for receiving a data packet from a core network, means for transforming the data packet to a wireless data, means for transmitting the wireless data obtained from transforming the data packet to a portable terminal, means for determining whether or not the portable terminal to which the wireless data is transmitted is in an area in which the portable terminal can communicate with another radio access network control apparatus, means for transmitting the wireless data to the another radio access network control apparatus when it is determined that the portable terminal to which the wireless data is transmitted is in an area in which the portable terminal can communicate with the another radio access network control apparatus, and means for transmitting the data packet received from the core network to the another radio access network control apparatus.

In another aspect of the present invention, the radio access network control apparatus may comprise: means for receiving the wireless data and the data packet from the another radio access network control apparatus, means for transmitting the wireless data received from the another radio access network control apparatus to the portable terminal, means for switching from the wireless data received from the another radio access network control apparatus to the wireless data obtained from transforming the data packet received from the another radio access network control apparatus as the wireless data to be transmitted to the portable terminal, and means for switching from the data packet received from the another radio access network control apparatus to the data packet received from the core network as the data packet to be transformed by the another radio access network control apparatus with synchronizing both data packets.

As will be described below, the present invention comprises other aspects. Accordingly, The disclosure of the present invention is not intended to limit the appended claims, but is intended to provide some of the aspects of the present invention.

BEST MODE FOR CARRYING OUT THE INVENTION

Figure 1:
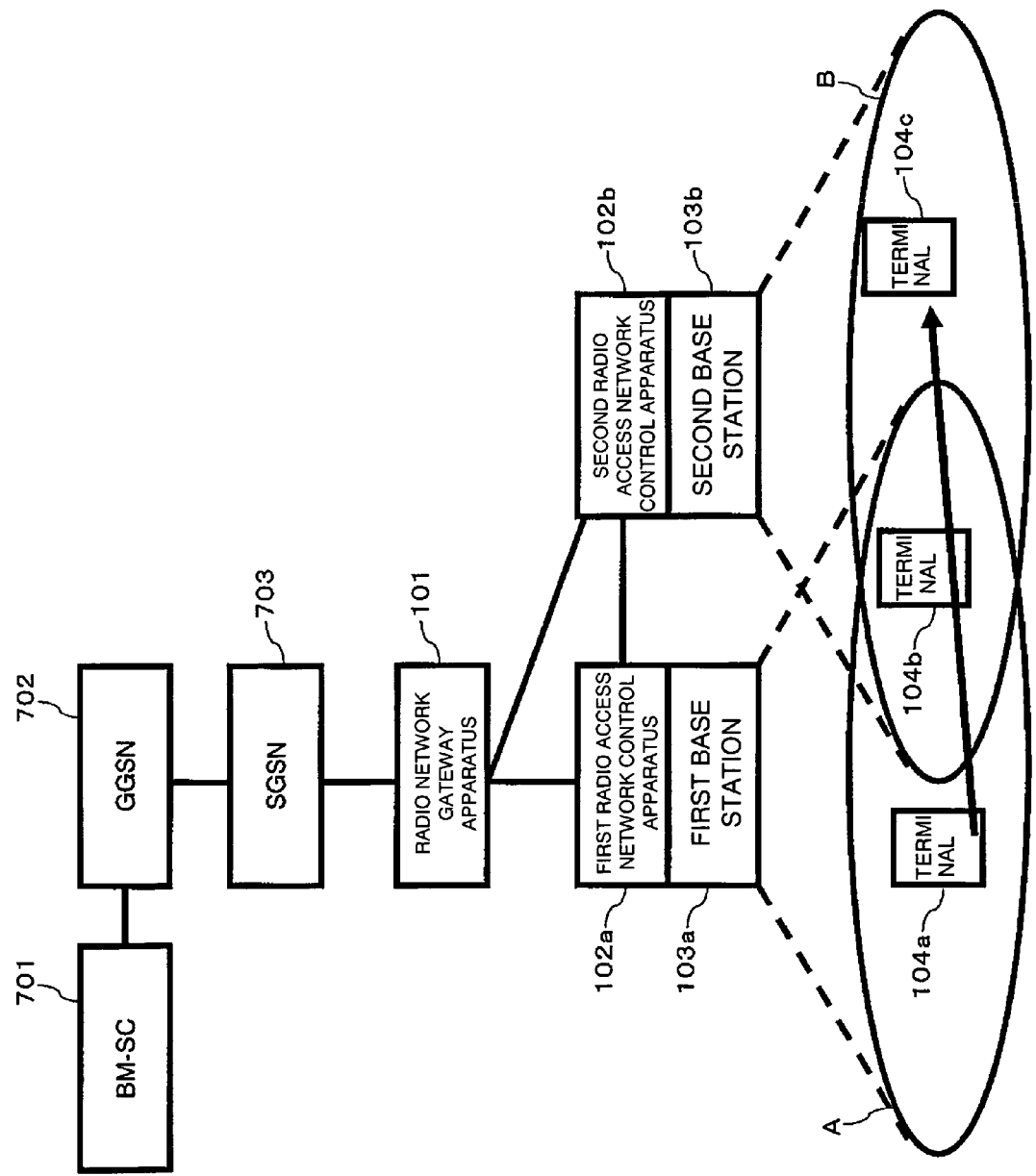
FIG. 1 is a whole diagram of a first embodiment.

The present invention will now be described below in detail. The detailed description and the accompanying drawings are not intended to limit the present invention. The scope of the present invention is defined by the appended claims.

In one aspect of the present embodiment, a radio access network control method for controlling radio access network comprising radio access network control apparatus for transforming a data packet received from a core network to a wireless data and transmitting the wireless data to a portable terminal, and the portable terminal for receiving the wireless data from the radio access network control apparatus, comprising the steps of: detecting the entrance of the portable terminal which is receiving the wireless data from radio access network control apparatus into an area in which the portable terminal can communicate with another radio access network control apparatus, wherein the another radio access network control apparatus is different from the radio access network control apparatus; transmitting the wireless data from the radio access network control apparatus to the another radio access network control apparatus, wherein the wireless data is transformed at the radio access network control apparatus; transmitting the wireless data from the another radio access network control apparatus to the portable terminal, wherein the wireless data is received at the another radio access network control apparatus from the radio access network control apparatus; and transmitting the data packet from the radio access network control apparatus to the another radio access network control apparatus, wherein the data packet is received at the radio access network control apparatus from the core network.

According to the radio access network control method, when the portable terminal which is receiving the wireless data from radio access network control apparatus enters into an area in which the portable terminal can communicate with another radio access network control apparatus, a required data packet is transmitted from the radio access network control apparatus to the another radio access network control apparatus in order to provide smooth soft handover. Therefore, the data packet is not required to be transmitted from the core network to the another radio access network control apparatus, so that traffic between the core network and the radio access network control apparatus can be reduced.

In another aspect of the present embodiment, the radio access network control method may comprise the step of transmitting a message from the another radio access network control apparatus to a data packet gateway apparatus, wherein the message indicates that a data packet is being received from the radio access network control apparatus.

In this way, the another radio access network control apparatus notifies of the data packet gateway apparatus that a data packet is being received from the radio access network control apparatus, so that the gateway apparatus can recognize a status of data packet reception in the another radio access network control apparatus. This allows the gateway apparatus to stop a data packet transmission to the other radio access network control apparatus.

In another aspect of the present embodiment, the radio access network control method may comprise the steps of: transforming the data packet to the wireless data at the another radio access network control apparatus, wherein the data packet is received from the radio access network control apparatus; switching at the another radio access network control apparatus from the wireless data received from the radio access network control apparatus to the wireless data obtained from the transformation as the wireless data to be transmitted to the portable terminal; receiving a data packet at the another radio access network control apparatus from the core network; and switching at the another radio access network control apparatus from the data packet received from the radio access network control apparatus to the data packet received from the core network with synchronizing both data packets as the data packet to be used in the transformation.

In this way, when the wireless packet to be transmitted to the portable terminal from the another radio access network control apparatus is switched from the wireless data received from the radio access network control apparatus to the wireless data obtained from the transforming the data packet received from the core network, a step of transmitting to the portable terminal the wireless data transformed from the data packet received from the radio access network control apparatus is provided. Then, a data packet to be transmitted to the portable terminal is switched with synchronizing the data packet received from the radio access network control apparatus and the data packet received from the core network, handover which reduces data loss is provided.

In another aspect of the present embodiment, the radio access network control method may comprise the step of stopping transmitting the data packet from the radio access network control apparatus to the another radio access network control apparatus, after the another radio access network control apparatus has started transmitting the wireless data to the portable terminal using the data packet from the core network.

In this way, by stopping transmitting the data packet from the radio access network control apparatus after the another radio access network control apparatus has started transmitting the wireless data transformed from the data packet received from the core network, the load of the radio access network control apparatus can be reduced.

In another aspect of the present embodiment, a radio access network control system comprises a radio access network control apparatus for transforming a data packet received from a core network to a wireless data and transmitting the wireless data to a portable terminal, and the portable terminal for receiving the wireless data from the radio access network control apparatus, wherein: when the portable terminal which is receiving the wireless data from radio access network control apparatus enters into an area in which the portable terminal can communicate with another radio access network control apparatus being different from the radio access network control apparatus, the radio access network control apparatus transmits the wireless data to the another radio access network control apparatus, wherein the wireless data is transformed by the radio access network control apparatus, the another radio access network control apparatus transmits the data received from the radio access network control apparatus to the portable terminal and the radio access network control apparatus transmits the data packet to the another radio access network control apparatus, wherein the data packet is received from the core network.

In the radio access network control system, as in the above radio access network control method, traffic between the core network and the radio access network control apparatus can be reduced during handover.

In another aspect of the present embodiment, the radio access network control system wherein: the another wireless network may transform the data packet received from the radio access network control apparatus to the wireless data, the another radio access network control apparatus may switch from the wireless data received from the radio access network control apparatus to the wireless data obtained from the transformation as the wireless data to be transmitted to the portable terminal, the another radio access network control apparatus may receive a data packet from the core network, and the another radio access network control apparatus may switch from the data packet received from the radio access network control apparatus to the data packet received from the core network with synchronizing both data packets as the data packet to be used in the transformation.

This allows handover reducing data loss to be provided as in the above radio access network control method.

In another aspect of the present embodiment, a radio access network control apparatus comprises means for receiving a data packet from a core network, means for transforming the data packet to a wireless data, means for transmitting the wireless data obtained from transforming the data packet to a portable terminal, means for determining whether or not the portable terminal to which the wireless data is transmitted is in an area in which the portable terminal can communicate with another radio access network control apparatus, means for transmitting the wireless data to the another radio access network control apparatus when it is determined that the portable terminal to which the wireless data is transmitted is in an area in which the portable terminal can communicate with the another radio access network control apparatus, and means for transmitting the data packet received from the core network to the another radio access network control apparatus.

According to the radio access network control apparatus, as in the radio access network control method described above, traffic between the core network and the radio access network control apparatus can be reduced during handover.

In another aspect of the present embodiment, the radio access network control apparatus may comprise: means for receiving the wireless data and the data packet from the another radio access network control apparatus, means for transmitting the wireless data received from the another radio access network control apparatus to the portable terminal, means for switching from the wireless data received from the another radio access network control apparatus to the wireless data obtained from transforming the data packet received from the another radio access network control apparatus as the wireless data to be transmitted to the portable terminal, and means for switching from the data packet received from the another radio access network control apparatus to the data packet received from the core network as the data packet to be transformed by the another radio access network control apparatus with synchronizing both data packets.

This allows handover which reduces data loss to be provided as in the above radio access network control method.

Radio access network control apparatus according to embodiments of the present invention will be described below. Although W-CDMA scheme is assumed below, the present invention is also applicable to GSM and MC-CDMA schemes in which a multicast service is provided and radio access network control apparatus has a wireless access network for controlling its nodes and terminals.

First Embodiment

First, a summary of a first embodiment is described. In the present embodiment, traffic between a radio network gateway apparatus and a radio access network control apparatus is reduced by transmitting an MBMS packet from a source radio access network control apparatus to a radio access network control apparatus accommodating a terminal using MBMS as a Drift RNC.

Figure 7:
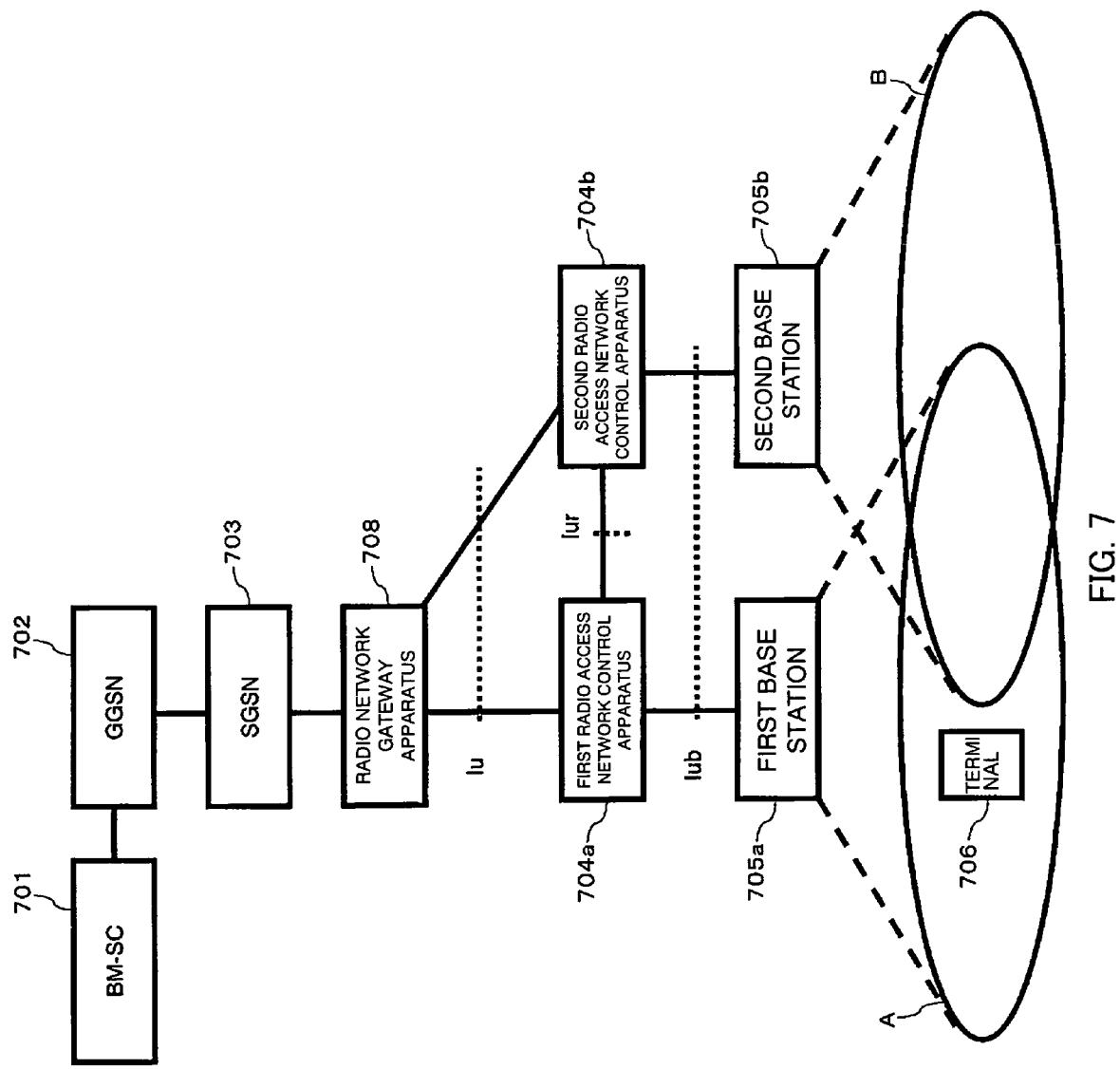
FIG. 7 is a whole diagram according to the prior art.

A configuration of a system according to the present embodiment will be described below with reference to FIG. 1. Configurations of nodes BM-SC 701 to SGSN 703 are the same as those shown in FIG. 7 according to the prior art.

A radio network gateway apparatus 101 relays an MBMS packet in the same way as the prior art. In the present embodiment, the radio network gateway apparatus 101 recognizes a status of MBMS packet transmission between the radio access network control apparatus 102a and 102b in addition to the operations in the prior art. The first and second radio access network control apparatus 102a, 102b control their wireless access network. In the following description, the first and second radio access network control apparatus 102a, 102b are collectively referred to as a radio access network control apparatus 102.

Both first and second base stations 103a, 103b perform transformation between a wired signal and a wireless data and transmit the signal and the wireless data. The first and second base stations 103a, 103b are collectively referred to as a base station 103. In the present embodiment, the radio access network control apparatus 102 and the base station 103 have a one-to-one correspondence. Since the present invention relates to a processing procedure between a node in a core network or a radio network gateway apparatus and a radio access network control apparatus, the same effect can be provided even if the radio access network control apparatus 102 and the base station 103 do not have a one-to-one correspondence.

A terminal 104 performs wireless communication. For the sake of explanation, when the terminal 104 is in a cell A, it is called as a terminal 104a, when it is in an area included in both cells A and B, it is called as a terminal 104b, when it is in a cell B, it is called as a terminal 104c. The terminal 104a moves from the terminal 104b to the terminal 104c. The terminals 104a and 104b communicate with the first base station 103a and the terminals 104b and 104c communicate with the second base station 103b.

The cells A and B are respectively communication areas of the first and second base stations 103a, 103b.

Figure 2:
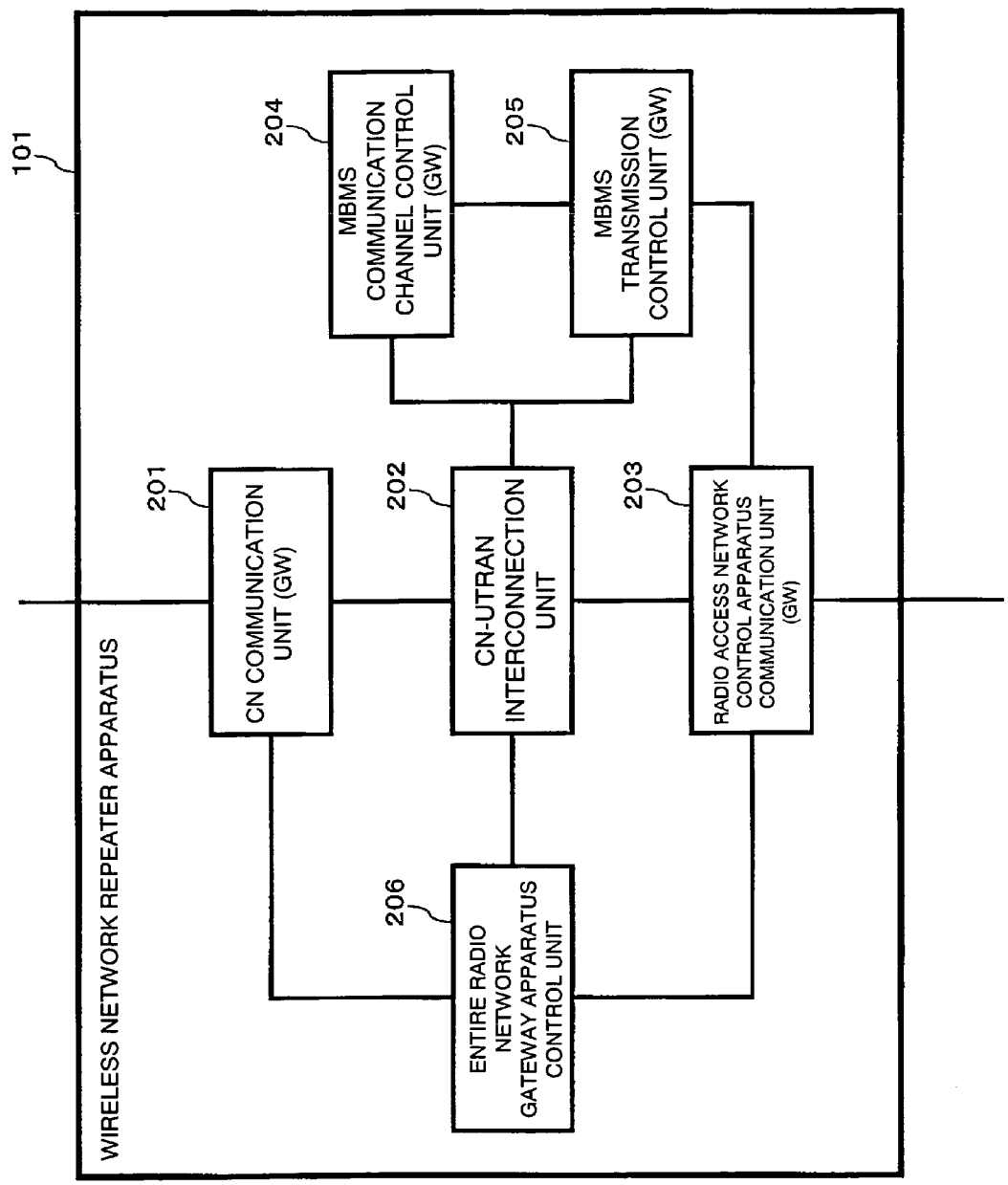
FIG. 2 is a block diagram showing a radio network gateway apparatus according to the first embodiment.

FIG. 2 shows an internal configuration of the radio network gateway apparatus 101. A CN communication unit (GW) 201 has a function for communicating with a node such as a SGSN 703 in a core network (CN). The CN communication unit (GW) 201 includes an Iu interface of a RNC side in 3GPP. A CN-UTRAN interconnection unit 202 transforms each identifier of (a plurality of) radio access network control apparatus 102 connected with a radio network gateway apparatus 101 relaying an Iu signal and enables the radio network gateway apparatus 101 to control the radio access network control apparatus 102 as a single radio access network control apparatus with respect to the node in the core network such as the SGSN 703.

A radio access network control apparatus communication unit (GW) 203 has a function for communicating with the radio access network control apparatus 102. The radio access network control apparatus communication unit (GW) 203 includes an Iu interface of a core network side in 3GPP.

An MBMS communication channel control unit (GW) 204 has a function for managing a communication channel for an MBMS packet with a radio access network control apparatus connected to the radio network gateway apparatus 101. The MBMS transmission control unit (GW) 205 copies a packet received at the CN communication unit (GW) 201 according to management information of the MBMS communication channel control unit (GW) 204 and outputs the copied packet from the radio network gateway apparatus 101. An entire radio network gateway apparatus control unit 206 performs controls except for those described above.

Figure 3:
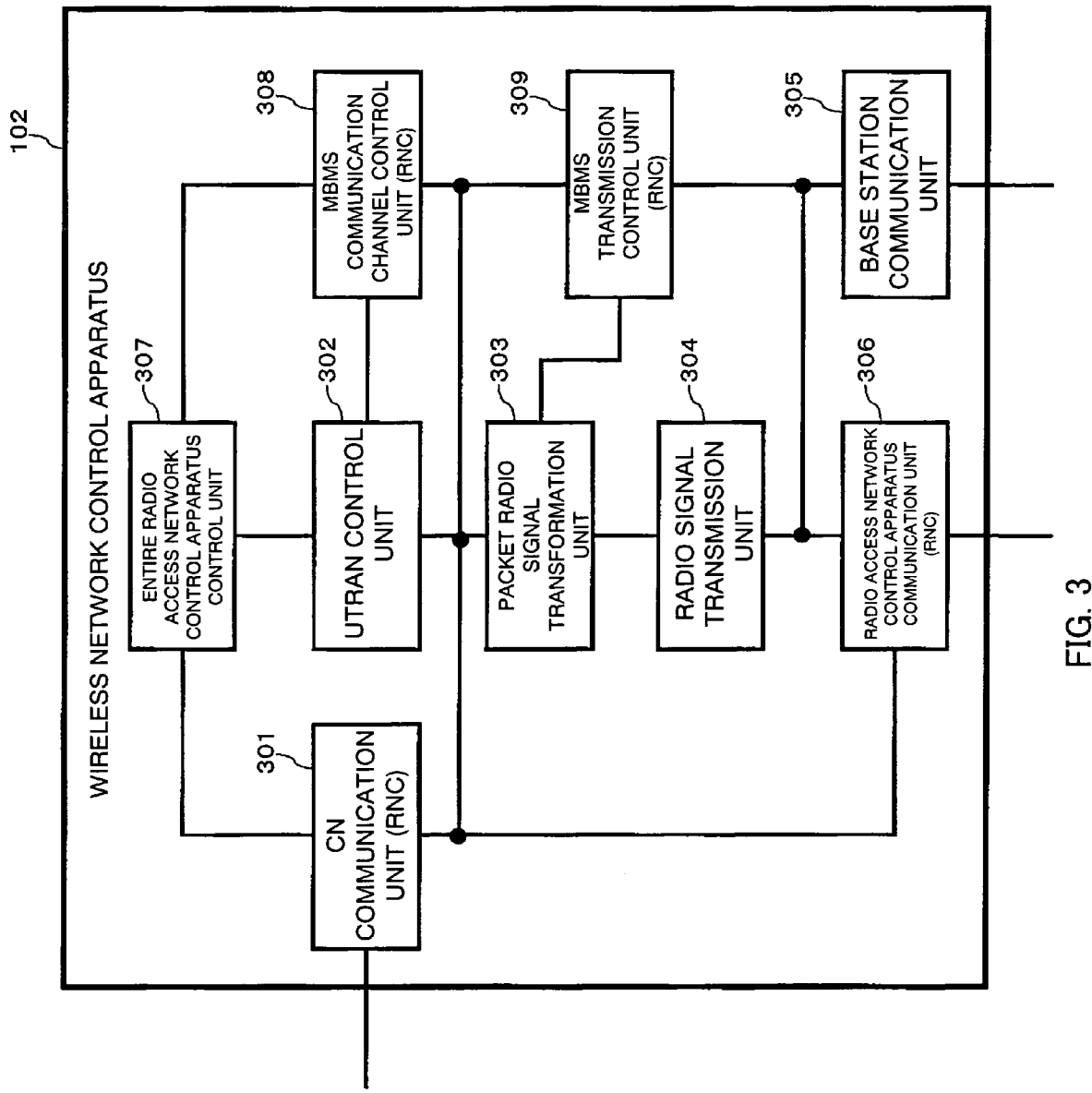
FIG. 3 is a block diagram showing a radio access network control apparatus according to the first embodiment.

FIG. 3 shows an internal configuration of the radio access network control apparatus 102. A CN communication unit (RNC) 301 has a function for communicating with a node in a core network such as the SGSN 703 and the radio network gateway apparatus 101. In the present embodiment, the CN communication unit (RNC) 301 communicates only with the radio network gateway apparatus 101.

A UTRAN control unit 302 has a function for controlling a wireless access network (UTRAN: Universal Terrestrial Radio Access Network). The UTRAN control unit 302 also controls operations of RRC (Radio Resource Control, a protocol between a terminal and a radio access network control apparatus) defined in 3GPP TS25.331.

A packet radio signal transformation unit 303 has a function for transforming a packet signal in the CN communication unit (RNC) 301 or the UTRAN control unit 302 to a wireless data. A packet radio signal transformation unit 303 includes a PDCP (3GPP TS25.323, Packet Data Convergence Protocol) and RLC (3GPP TS25.322, Radio Link Control) functions in 3GPP. A radio signal transmission unit 304 has a function for modifying a wireless data to a channel data used by the base station 103 and transmitting the channel data. The radio signal transmission unit 304 includes MAC (3GPP TS25.321, Meda Access Control) function in 3GPP.

A base station communication unit 305 communicates with the base station 103. The base station communication unit 305 includes functions such as Iub interface in 3GPP and a transport protocol between networks. A radio access network control apparatus communication unit (RNC) 306 communicates with another radio access network control apparatus 102. The radio access network control apparatus communication unit (RNC) 306 includes Iur interface function in 3GPP. An entire radio access network control apparatus control unit 307 performs controls that other functional elements do not perform, such as monitoring control. Under control of the radio access network control apparatus 102, an MBMS communication channel control unit (RNC) 308 manages the terminal 104 to which the MBMS packet inputted from the radio network gateway apparatus 101 is transmitted. An MBMS transmission control unit (RNC) 309 has a function for copying the received packet and transmitting the copied packet to a destination managed by the MBMS communication channel control unit (RNC) 308.

Figure 4:
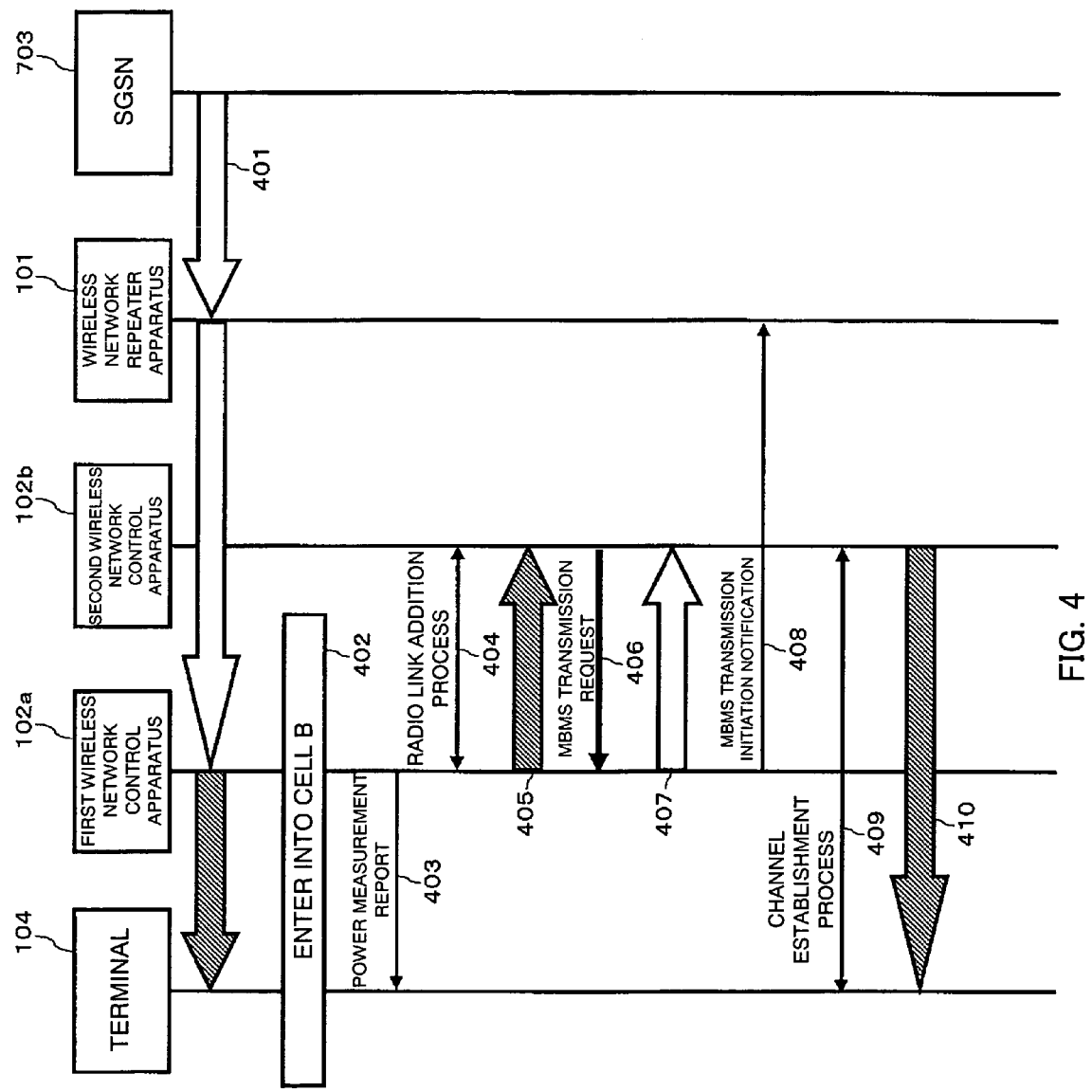
FIG. 4 is a sequence diagram showing operations in the first embodiment.
Figure 8:
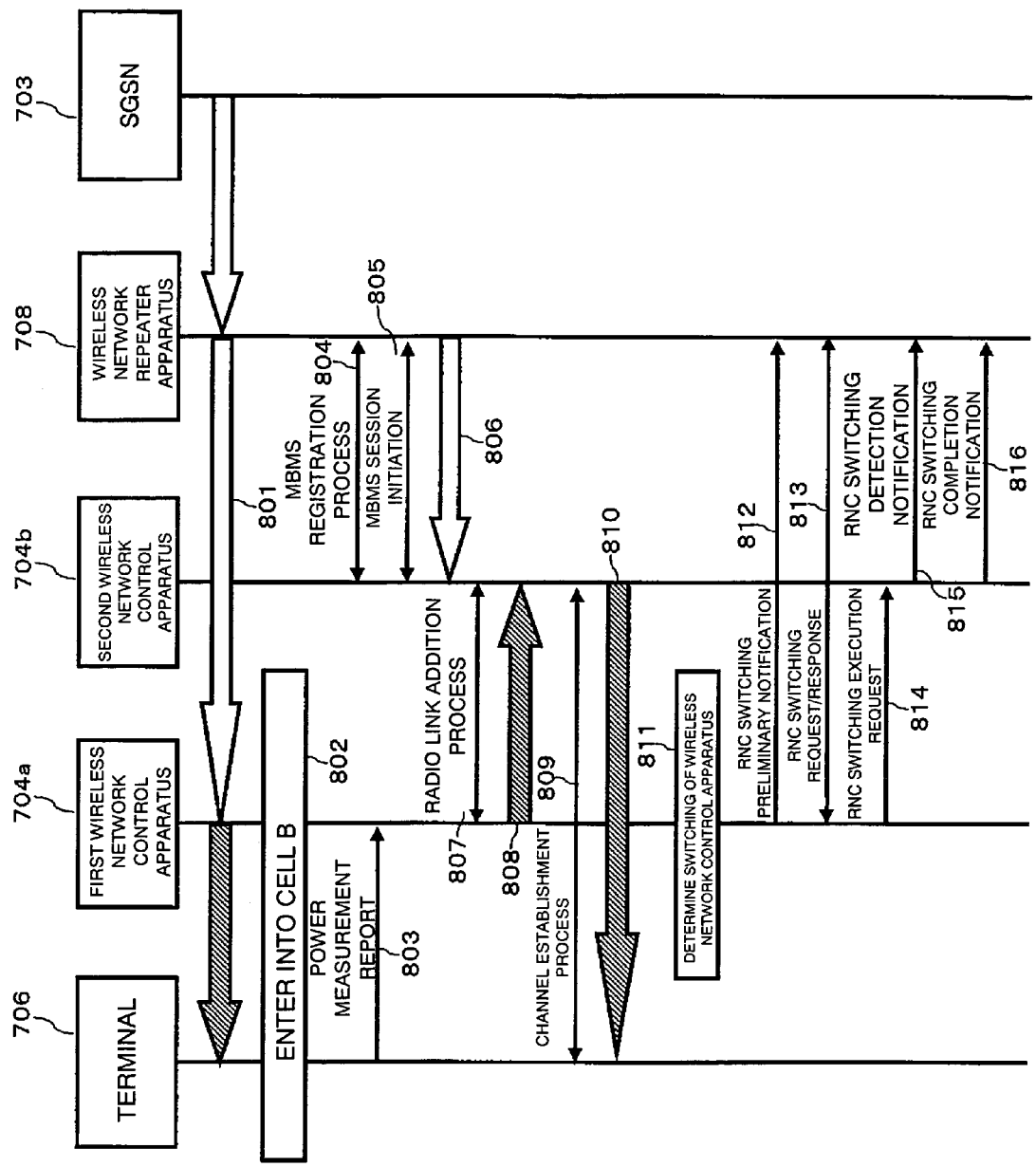
FIG. 8 is a sequence diagram during switching of a radio access network control apparatus according to the prior art.

The following description will be made with reference to FIG. 4 which is a sequence diagram showing operations in the present embodiment. In FIG. 4, an outline arrow denotes a flow of a packet data and a shaded arrow denotes a flow of wireless data. Signals 401,402,403,404 and 405 are the same as the signals 801,802,803,807,808 in FIG. 8 showing operations in the prior art, respectively.

In the present embodiment, in order to reduce traffic between the radio network gateway apparatus 708 and the second radio access network control apparatus 704b in the prior art, a packet data for the Drift RNC is transmitted from the first radio access network control apparatus 102a which is the Serving RNC. Therefore, after establishing a radio link with the first radio access network control apparatus 102a, the second radio access network control apparatus 102b outputs to the first radio access network control apparatus 102a an MBMS transmission request 406 for transmitting a packet data along with a wireless data.

At this point, the following processes are performed within the second radio access network control apparatus 102b. After the UTRAN control unit 302 established a radio link with the first radio access network control apparatus 102a (405), this information and the information about the second radio access network control apparatus 102b being the Drift RNC are transmitted to the MBMS communication channel control unit (RNC) 308. At this point, since the MBMS packet has not transmitted to the second radio access network control apparatus 102b, the MBMS communication channel control unit (RNC) 308 determines that it receives the MBMS data as a packet from the first radio access network control apparatus 102a from which the wireless data is transmitted. The radio access network control apparatus communication unit (RNC) 306 performs receiving preparations of a packet as necessary. For example, the receiving preparations are a process for establishing a port in an IP network and a process for establishing a path in ATM. In the following, in an apparatus or a functional block to which a packet data or a wireless data is inputted, a receiving preparation for the data is performed as necessary even when there is no particular description prior to data input. If another second radio access network control apparatus 102*b* is receiving from the radio network gateway apparatus and transmitting to another terminal the same MBMS packet as the packet which is toward to the terminal 104*b*, the packet being transmitted to the another terminal is transformed to the wireless data and the wireless data is transmitted to the terminal 104*b*.

The MBMS communication channel control unit (RNC) 308 requests the UTRAN control unit 302 to output the above-described MBMS transmission request 406 to the first radio access network control apparatus 102*a* via the radio access network control apparatus communication unit (RNC) 306, then the MBMS transmission request 406 is outputted to the first radio access network control apparatus 102*a*.

In response to the MBMS transmission request 406, the first radio access network control apparatus 102*a* initiates to output a packet data to the second radio access network control apparatus 102*b*. Here, the following processes are performed within the first radio access network control apparatus 102*a*. When the MBMS transmission request 406 is inputted from the radio access network control apparatus communication unit (RNC) 306, the MBMS communication channel control unit (RNC) 308 detects the MBMS transmission request 406 and requests the MBMS transmission control unit (RNC) 309 to output the MBMS packet data to the second radio access network control apparatus 102*b*.

The second radio access network control apparatus 102*b* transmits the wireless data to the terminal 104*b* via the second base station 103*b*. Here, the following processes are performed within the second radio access network control apparatus 102*b*. The transmitted MBMS packet data is inputted to the CN communication unit (RNC) 301 in the second radio access network control apparatus. Then the MBMS transmission control unit (RNC) 309 creates a copy of the inputted packet data for each base station to which the inputted packet data is outputted. The copy of the packet data is outputted to the packet radio signal transformation unit 303. The packet radio signal transformation unit 303 transforms the packet data to a wireless data. Further, the radio signal transmission unit 304 transforms the wireless data to a channel data and the base station communication unit 305 outputs the channel data to the second base station 103*b*.

The first radio access network control apparatus 102*a* outputs an MBMS transmission initiation notification 408 to the radio network gateway apparatus 101. This allows the radio network gateway apparatus 101 to recognize that the packet data is transmitted to the second radio access network control apparatus 102*b*. Within the first radio access network control apparatus 102*a*, the MBMS communication channel control unit (RNC) 308 generates the MBMS transmission initiation notification 408 and outputs the generated MBMS transmission initiation notification 408 from the CN communication unit (RNC) 301 via the UTRAN control unit 302.

On the other hand, when the MBMS transmission initiation notification 408 is inputted to the radio network gateway apparatus 101, the MBMS communication channel control unit (GW) 204 detects the MBMS transmission initiation notification 408 inputted via the CN-UTRAN interconnection unit 202 and records that the packet data is being transmitted. A channel establishment process 409 and a wireless data transmission process 410 are respectively same as the channel establishment process 809 and a wireless data transmission process 810 according to the prior art.

If there is the MBMS transmission initiation notification 408, it is easily expected that traffic between the radio network gateway apparatus 101 and the radio access network control apparatus 102 can be reduced as above even if a packet data is not transmitted between the first radio access network control apparatus 102*a* and the second radio access network control apparatus 102*b*.

It is also easily expected that the second radio access network control apparatus 102*b* can transmit to the first radio access network control apparatus 102*a* an MBMS transmission stop notification specifying the MBMS so that the first radio access network control apparatus stop transmitting the MBMS packet data.

Although it is assumed that the radio network gateway apparatus 708 is deployed in the present embodiment, by adding a function for managing a transmission path for an MBMS packet to the SGSN 703 in response to the MBMS transmission initiation notification, the present embodiment may also apply to the case where there is not the radio network gateway apparatus 101.

It can also be expected that even if switching of the radio access network control apparatus 102 occurs when a packet which is not MBMS is transmitted, the above effect is obtained by transmitting a packet from the source radio access network control apparatus 102 to the target radio access network control apparatus 102 during the switching as in the present embodiment.

As described above, traffic is reduced in the present embodiment by preventing an MBMS packet data transmission between the radio network gateway apparatus 101 and the radio access network control apparatus 102*b* when the terminal 104 is being moved.

Second Embodiment

A second embodiment will be described below. First, a summary of the second embodiment is described. In the present embodiment, a method of reducing packet loss by synchronizing source and target channels during switching the connected radio access network control apparatus 102 after the terminal 104 is moved in the new cell B is illustrated.

Figure 5A:
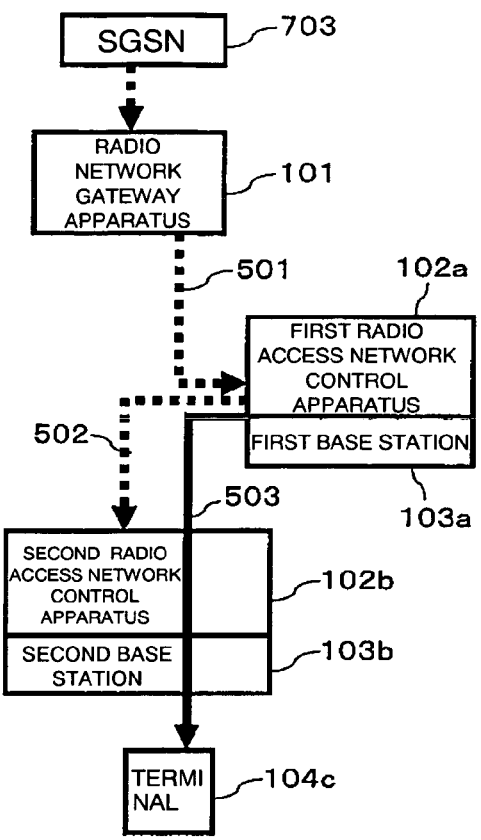
FIG. 5A is a schematic view showing switching of a transmission line according to a second embodiment.
Figure 5B:
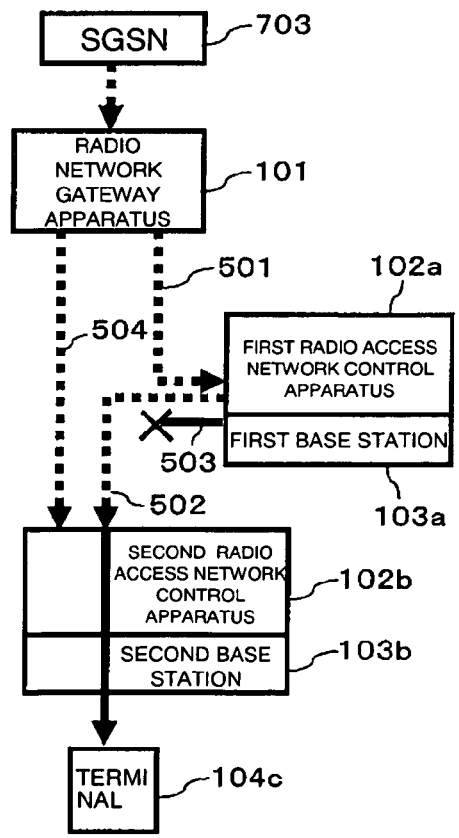
FIG. 5B is a schematic view showing switching of a transmission line according to the second embodiment.
Figure 5C:
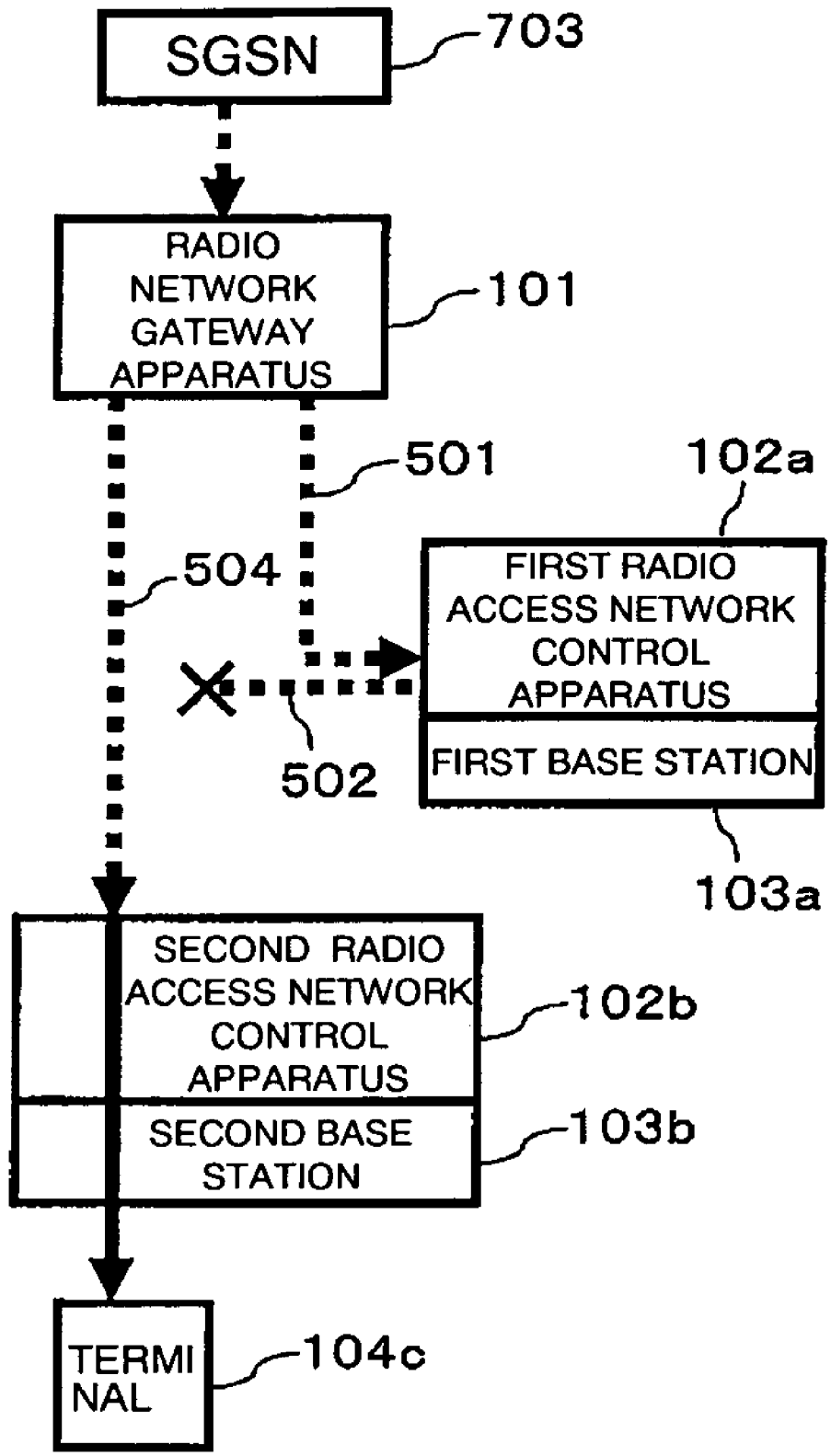
FIG. 5C is a schematic view showing switching of a transmission line according to the second embodiment.

FIGS. 5A to 5C show a summary of the switching method according to the present embodiment. In the present embodiment, a procedure, which is split into two steps, for switching from a transmission line via the radio access network control apparatus 102*a* to which the terminal 104*c* is connected to a transmission line via the radio access network control apparatus 102*b* for controlling the cell B to which the terminal 104*c*. FIG. 5A shows a state where the terminal 104*c* left the cell A and has just entered the cell B and FIGS. 5B and 5C show states after a first and second steps of the switching respectively.

In FIGS. 5A to 5C, components of the wireless control system are the same as those in the first embodiment. Lines indicate transmission lines of channels. Dotted lines indicate a transmission line of a packet data, and solid lines indicate a transmission line of a wireless data. Here, a logical channel such as DTCH or MTCH between RLC and MAC layer is assumed. The method according to the present embodiment is also applicable to both DTCH and MTCH used in MBMS since it relates to a data transmission line between the SGSNs 703 or the radio network gateway apparatus 101. For example, a packet transmitted through a transmission line of a packet data is assumed to be an IP packet or a packet encapsulated by GTP (GPRS Tunneling Protocol) in 3GPP. Each packet includes a sequence number given by the SGSN 703 or the radio access network control apparatus 102*b* and a node which outputs the packet increments the sequence number by one when it outputs a packet.

FIG. 5A shows that the transmission from the radio network gateway apparatus 101 to the second radio access network control apparatus 102b is made via the following two paths immediately after the terminal 104c moved: (1) a wireless data is transmitted from the source first radio access network control apparatus 102a to the target second radio access network control apparatus 102b via the source first radio access network control apparatus 102a, and (2) a packet data is transmitted from the source first radio access network control apparatus 102a to the target radio access network control apparatus 102b via the source first radio access network control apparatus 102a.

Switching of the transmission line to the target second radio access network control apparatus 102b is performed by switching from the path (1) through which transmission to the terminal 104c occurs to the following path: (3) a packet data is transmitted between the radio network gateway apparatus 101 and the target radio access network control apparatus 102b without passing through the source first radio access network control apparatus 102a.

However, in the state in FIG. 5A, the second radio access network control apparatus 102b simply relays a wireless data in the path (1) and does not have packet sequence number information and therefore synchronization with the path (3) can not be achieved.

For this purpose, the first radio access network control apparatus 102a performs switching from the path (1) to the path (2). And a transmission through the path (3) is initiated. The result is shown in FIG. 5B. The first radio access network control apparatus 102a manages data in both of these transmission lines and recognizes the correspondence between packets in the packet transmission line 502 and a data frame in the wireless data transmission line 503. Therefore, the first radio access network control apparatus 102a can switch the transmission line without loss. This switching causes the transmission through the wireless data transmission line 503 to stop (see FIG. 5B).

Next, the second radio access network control apparatus 102b performs switching from the path (2) to the path (3). The result is shown in FIG. 5C. In this switching, the second radio access network control apparatus 102b can acquire packet sequence numbers in both of the packet transmission line 502 and the packet transmission line 504 and therefore can switch the transmission line without loss. After this switching, the transmission through the packet transmission line 502 is stopped (see FIG. 5C).

The switching procedure will be described below in detail with reference to FIG. 6. A signal 601 indicates an initial state of the transmission line according to the present embodiment. This state occurs after the controlling described in the first embodiment. At this point I, a data is being transmitted from the radio network gateway apparatus 101 to the second radio access network control apparatus 102b using two transmission lines as shown in FIG. 5A. The first radio access network control apparatus 102a is operating as a Serving RNC and the second radio access network control apparatus 102b is operating as a Drift RNC.

Next, at event 602, the first radio access network control apparatus 102a determines to switch the Serving RNC of the terminal 104c. Although the reasons for switching the Serving RNC may be distributing loads between the radio access network control apparatus, causing the communication quality between the moved terminal 104c and the second base station 103b to exceed a threshold and to be stabilized, or the like, the present embodiment is applicable regardless of the reason.

After determining to switch the Serving RNC, the first radio access network control apparatus 102a outputs an MBMS channel switching request 603 specifying the channel after the switching to the target radio access network control apparatus. In response to the MBMS channel switching request 603, the second radio access network control apparatus 102b requests the radio network gateway apparatus 101 to register with the MBMS to which the terminal 104c is subscribing using a procedure of an MBMS registration 604. This procedure may be provided by MBMS REGISTRATION REQUEST and MBMS REGISTRATION RESPONSE in RNC Registration Procedure in 3GPP TS25.346. If the second radio access network control apparatus 102b has been already registered with the MBMS, this procedure is not required.

After registration has been completed, using a procedure of an MBMS session start 605 specifying MBMS to which the terminal 104c is subscribing, the second radio access network control apparatus 102b requests the radio network gateway apparatus 101 to start an MBMS packet data transmission to the second radio access network control apparatus 102b. This procedure may be provided by MBMS SESSION START REQUEST and MBMS SESSION START RESPONSE in MBMS Session Start procedure in 3GPP TS25.346.

As a result of the MBMS session start procedure 605, the radio network gateway apparatus 101 starts to transmit the MBMS packet to the second radio access network control apparatus 102b (signal 606). At this point, the following processes are performed within the radio network gateway apparatus 101. The MBMS session start 605 is inputted to the radio access network control apparatus communication unit (GW) 203 and the CN-UTRAN interconnection unit 202 transfers the inputted MBMS session start 605 to the MBMS communication channel control unit (CN) 204. The MBMS communication channel control unit (GW) 204 recognizes that the radio network gateway apparatus 101 has not transmitted the MBMS packet for the terminal 104c to the second radio access network control apparatus 102b. Therefore, when recognizing the MBMS session start 605, it controls the MBMS transmission control unit (CN) 205 to start to transmit the MBMS packet. This is denoted by a signal 606.

The second radio access network control apparatus 102b outputs an MBMS channel switching response 607 to the first radio access network control apparatus 102a. If possible, the second radio access network control apparatus 102b may notify the first radio access network control apparatus 102a of a timing when the switching of the transmission line is possible. If the notification occurs, when the first radio access network control apparatus 102a determines a timing of switching the transmission line in an MBMS signal switching request 608 described below, the timing of switching the transmission line can be more reliably set using the timing notified by the second radio access network control apparatus 102b.

When receiving the MBMS channel switching response 607, the first radio access network control apparatus 102a outputs to the second radio access network control apparatus 102b an MBMS signal switching request 608 for switching the data to be transmitted to the terminal 104c from the wireless data transmission line 503a to the packet data transmission line 502a. The first radio access network control apparatus 102a specifies a timing of switching in the MBMS signal switching request 608. A method of specifying the timing may be any of time, the frame number of the wireless data, the sequence number of the packet data.

At this point, the following processes are performed within the first radio access network control apparatus 102a. When outputting the MBMS signal switching request 608, the MBMS communication channel control unit (RNC) 308 calculates a timing of stopping outputting the wireless data. If timing when the switching of the transmission line is possible is specified in the MBMS channel switching response 607, the timing of stopping outputting the wireless data is specified to be later than that timing.

After calculating the timing, the MBMS communication channel control unit (RNC) 308 directs the MBMS transmission control unit (RNC) 309 to stop outputting the wireless data when the specified timing has come. The MBMS communication channel control unit (RNC) 308 generates the MBMS signal switching request 608 by storing the specified timing and information for identifying the target packet data transmission line and outputs the generated MBMS signal switching request 608 to the second radio access network control apparatus 102b using the radio access network control apparatus communication unit (RNC) 306.

In response to the MBMS signal switching request 608, the second radio access network control apparatus 102b determines whether or not the switching of the transmission line is possible and outputs an MBMS signal switching response 609 to the first radio access network control apparatus 102a. In the present embodiment, the second radio access network control apparatus 102b responds with a response indicating that the switching of the transmission line is possible. At event 610, the second radio access network control apparatus 102b switches transmission line through which the data is transmitted to the terminal 104c from the wireless data transmission line 503a to the packet data transmission line 502a at the timing specified in the MBMS signal switching request 608.

At this point, the following processes are performed within the second radio access network control apparatus 102b. The MBMS signal switching request 608 is transferred to the MBMS communication channel control unit (RNC) 308 via the CN communication unit (RNC) 301 and the UTRAN control unit 302. The MBMS communication channel control unit (RNC) 308 directs the MBMS transmission control unit (RNC) 309 to switch the transmission line from the wireless data transmission line 503a to the packet data transmission line 502a when the timing specified in the MBMS signal switching request 608 has come.

The MBMS transmission control unit (RNC) 309 initially outputs to the base station 103b via the radio signal transmission unit 304 and the base station communication unit 305 the wireless data inputted from the first radio access network control apparatus 102a via the radio access network control apparatus communication unit (RNC) 306. At this point, the packet data from the first radio access network control apparatus 102a is also inputted via the radio access network control apparatus communication unit (RNC) 306.

The MBMS transmission control unit (RNC) 309 identifies at least one of the frame number of the wireless data or the sequence number of the packet data and detects that the timing specified in the MBMS communication channel control unit (RNC) 308 has come. The MBMS transmission control unit (RNC) 309 stops the output of the wireless data via the radio signal transmission unit 304. The packet radio signal transformation unit 303 initiates transformation of the packet data inputted via the radio access network control apparatus communication unit (RNC) 306 to a new wireless data and outputs it to the second base station 103b via the radio signal transmission unit 304 and the base station communication unit 305.

When the timing specified in the MBMS signal switching request 608 has come, the first radio access network control apparatus 102a determines that switching of the transmission line from the wireless data transmission line 503a to the packet data transmission line 502a in the second radio access network control apparatus 102b has been completed and stops the wireless data transmission 611 to the second radio access network control apparatus 102b. FIG. 5B shows the state at the point II when this process has been completed.

At this point, the following processes are performed within the first radio access network control apparatus 102a. The wireless data from the first radio access network control apparatus 102a to the second radio access network control apparatus 102b is outputted by the MBMS transmission control unit 309 in the first radio access network control apparatus 102a to the second radio access network control apparatus 102b using the radio access network control apparatus communication unit (RNC) 306. The MBMS transmission control unit (RNC) 309 identifies at least one of the frame number of the wireless data or the sequence number of the packet data and when it detects that the timing specified in the MBMS communication channel control unit (RNC) 308 has come, it stops outputting the wireless data via the radio signal transmission unit 304.

From the state shown in FIG. 5B, the Serving RNC is switched. This can be preformed using the same signaling as SRNS Relocation in 3GPP TR25.931. First, the first radio access network control apparatus 102a outputs an RNC switching preliminary notification 612 to the radio network gateway apparatus 101. This message may be provided by RELOCATION REQUIRED message in 3GPP TS25.413.

When receiving the RNC switching preliminary notification 612, the radio network gateway apparatus 101 performs a procedure of a RNC switching request/response 613 to the radio network gateway apparatus 101. A target transmission line (RAB, Radio Access Bearer) is specified. RNC switching request/response 613 may be provided by RELOCATION REQUEST and RELOCATION REQUEST ACKNOWLEDGE procedures in 3GPP TS25.413. Although a wireless data is transmitted between radio access network control apparatus in a normal switching procedure of radio access network control apparatus, it is required to specify switching of a packet data in the present embodiment because a packet data is transmitted.

After the RNC switching request/response 613 has been completed, the first radio access network control apparatus 102a outputs the RNC switching execution request 614 for the terminal 104c to the second radio access network control apparatus 102b. In the RNC switching execution request 614, the sequence number of a packet at which upstream/downstream transmission lines are switched is specified. Let N be this number.

At event 615, the second radio access network control apparatus 102b switches the transmission line. For packets having sequence number less than N−1, the second radio access network control apparatus 102b transforms a packet received from the first radio access network control apparatus 102a via the packet data transmission line 502 to a wireless data and outputs it to the terminal 104c. For packets having sequence number greater than or equal to N, the second radio access network control apparatus 102b switches the receiving transmission line and transforms a packet received from the first radio access network control apparatus 101 via the packet data transmission line 504 to a wireless data and outputs it. In this way, switching can be performed without data loss by receiving the packet from both the source first radio access network control apparatus 102a and the radio network gateway apparatus 101 and performing the switching based on the packet sequence number.

At the same time, the radio network gateway apparatus 101 changes the transmission line at the upstream sequence number specified in the RNC switching request/response 613 for upstream packet such that a packet from the first radio access network control apparatus 102a to the second radio access network control apparatus 102b is used for upstream transmission.

At this point, the following processes are performed within the second radio access network control apparatus 102b. A packet data from the first radio access network control apparatus 102a is inputted to the radio access network control apparatus communication unit (RNC) 306 and the MBMS transmission control unit (RNC) 309 outputs it to the packet radio signal transformation unit 303. On the other hand, an MBMS packet data from the radio network gateway apparatus 101 is inputted to the CN communication unit (RNC) 301 and also passes through the MBMS transmission control unit (RNC) 309 and the packet radio signal transformation unit 303.

The RNC switching execution request 614 is inputted to the MBMS communication channel control unit (RNC) 308 via the radio access network control apparatus communication unit (RNC) 306 along with timing information for switching. The MBMS communication channel control unit (RNC) 308 directs the MBMS transmission control unit (RNC) 309 to switch to an MBMS packet via the CN communication unit (RNC) 301 when the sequence number of the MBMS packet is N. This direction causes the MBMS transmission control unit (RNC) 309 to switch to a signal from the MBMS data packet inputted from the radio network gateway apparatus 101 via the CN communication unit (RNC) 301 when the sequence number of the MBMS packet is N. In this way, the radio access network control apparatus 102 switches the inputted MBMS sequence number or frame number, so that the packet loss can be reduced.

When the RNC switching execution request is inputted, the second radio access network control apparatus 102b outputs a RNC switching detection notification 616 to the radio network gateway apparatus 101. When the switching of the transmission line has been completed, the second radio access network control apparatus 102b outputs a RNC switching completion notification 617 to the radio network gateway apparatus 101. Then the switching process of the Serving RNC is completed.

After the switching process of the Serving RNC has been completed, the radio network gateway apparatus 101 outputs to the first radio access network control apparatus 102a a procedure of a RNC-to-RNC transmission stop 618 for stopping a channel for the terminal 104c between the first radio access network control apparatus 102a and the second radio access network control apparatus 102b. In response to this, as shown in a signal 619, the first radio access network control apparatus 102a stops the transmission in the corresponding packet data transmission line 504a. FIG. 5C shows the state at this point III.

At this point, the following processes are performed within the first radio access network control apparatus 102a. When the RNC-to-RNC transmission stop request 618 is inputted to the radio access network control apparatus communication unit (RNC) 306, the MBMS communication channel control unit (RNC) 308 detects the request. According to the request, the MBMS communication channel control unit (RNC) 308 directs the MBMS transmission control unit (RNC) 309 to stop the MBMS packet transmission to the terminal 104c. According to the direction, the MBMS transmission control unit (RNC) 309 controls the packet radio signal transformation unit 303 to stop the packet transmission to the radio signal transmission unit 304.

In the present embodiment, the method of switching the radio access network control apparatus 102 without loss is provided by switching from the source radio access network control apparatus 102a to the target radio access network control apparatus 102b in two steps in which the switching is performed in synchronized manner.

Although a data is not transmitted between the first radio access network control apparatus 102a and the terminal 104c in an initial state, the present embodiment is applicable to the case where a data is transmitted.

Although the present embodiment is assumed to provide the first embodiment, by estimating switching of the radio access network control apparatus 102 or newly initiating packet transmission from the first radio access network control apparatus 102a to the second radio access network control apparatus 102b after an MBMS channel switching request is inputted from the radio access network control apparatus 102 to apply the sequence from midstream, the similar effect as the present embodiment is obtained even if a packet is not initially transmitted from the second radio access network control apparatus 102b to the first radio access network control apparatus 102a.

Figure 6:
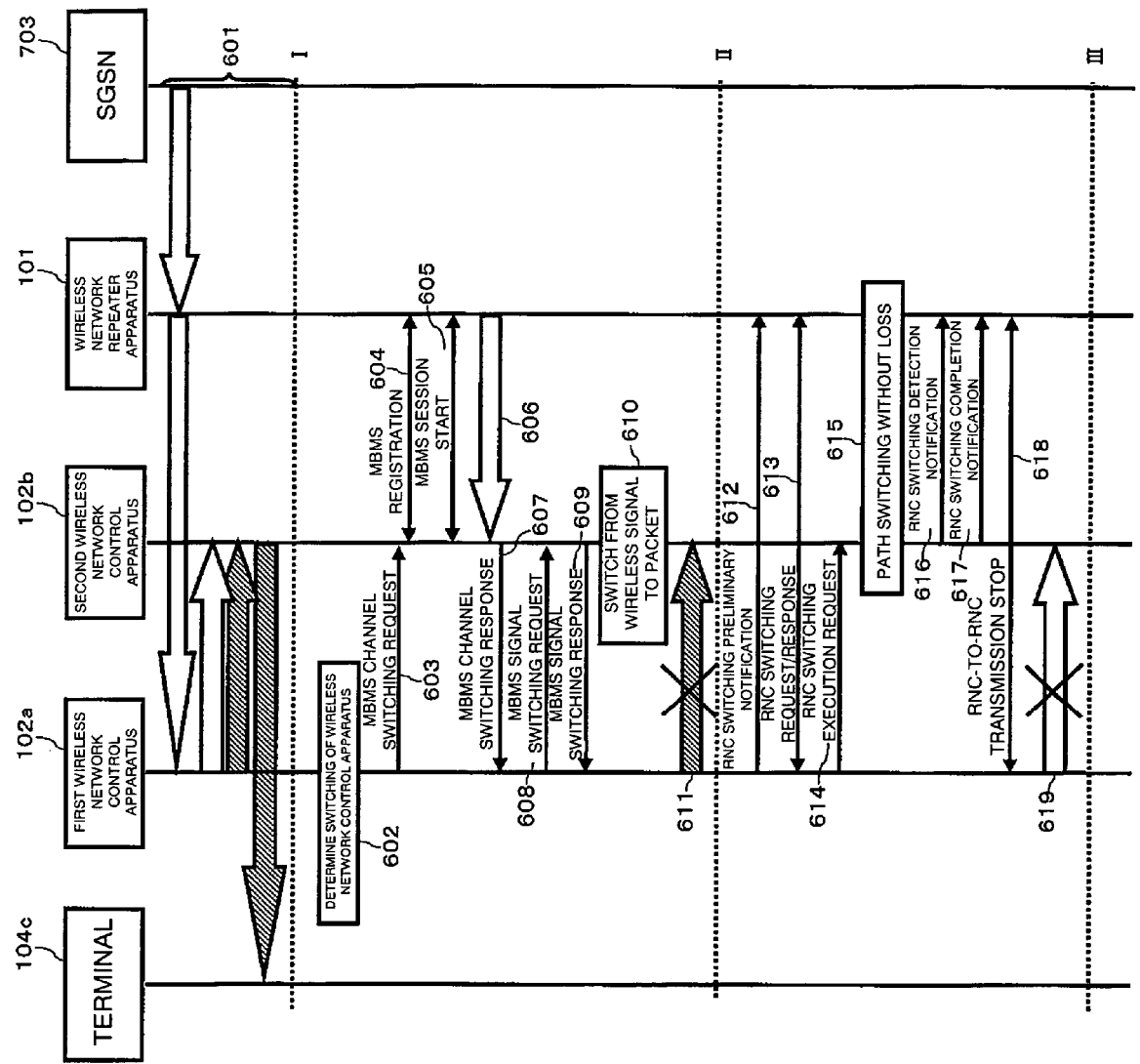
FIG. 6 is a sequence diagram showing operations in the second embodiment.

Although the procedure of the RNC-to-RNC transmission stop 618 is depicted in FIG. 6 as being completed before the transmission between the first radio access network control apparatus 102a and the second radio access network control apparatus 102b is stopped, the similar effect as the present embodiment is obtained in practice even if a response indicating transmission stop is outputted from the first radio access network control apparatus 102a after the signal 619. Similarly, the similar effect as the present embodiment is obtained even if the order in other procedures is modified without departing from the spirit of the present embodiment.

If the SGSN 703 provides for a processing corresponding to the MBMS channel switching request, the similar effect as the present embodiment is obtained without the radio network gateway apparatus 102.

Also, for packet communication services except for MBMS, if a terminal transmits a service it is using to the source and target radio access network control apparatus 102a, 102b when switching the radio access network control apparatus and the similar sequence as the present embodiment is processed, the switching without loss is possible as in the present embodiment.

Although the presently preferred embodiments according to the present invention have been described above, it will be understood that various modifications may be made to the present embodiments and the appended claims are intended to encompass all such modifications which fall within the true spirit and the scope of the present invention.

INDUSTRIAL APPLICABILITY

As has been described, the present invention has an excellent effect of reducing traffic between a core network and a radio access network control apparatus since a data packet is transmitted from one of radio access network control apparatus to another one of radio access network control apparatus when a portable terminal receiving a wireless data from the radio access network control apparatus enters into an area in which the portable terminal can communicate with another radio access network control apparatus, and is useful as a radio access network control method control apparatus which maintains a communication when the terminal moves between cells while, for example, a service using multicast is provided in a wireless access network of a mobile communication system.

The invention claimed is:

1. A method for controlling a radio access network comprising a radio access network control apparatus for transforming a data packet received from a core network to a wireless data and transmitting the wireless data to a portable terminal, and the portable terminal for receiving the wireless data from the radio access network control apparatus, the method comprising the steps of:

detecting an entrance of the portable terminal which is receiving the wireless data from the radio access network control apparatus into an area in which the portable terminal can communicate with another radio access network control apparatus, wherein the another radio access network control apparatus is different from the radio access network control apparatus;

transmitting the wireless data from the radio access network control apparatus to the another radio access network control apparatus, wherein the wireless data is transformed at the radio access network control apparatus;

transmitting the wireless data from the another radio access network control apparatus to the portable terminal, wherein the wireless data is received at the another radio access network control apparatus from the radio access network control apparatus; transmitting the data packet from the radio access network control apparatus to the another radio access network control apparatus, wherein the data packet is received at the radio access network control apparatus from the core network;

identifying a correspondence between (i) the wireless data transmitted from the radio access network control apparatus to the another radio access network control apparatus and (ii) the data packet transmitted from the radio access network control apparatus to the another radio access network control apparatus;

transforming the data packet to the wireless data at the another radio access network control apparatus, wherein the data packet is received from the radio access network control apparatus;

switching at the another radio access network control apparatus, based on the identified correspondence between (i) the wireless data transmitted from the radio access network control apparatus to the another radio access network control apparatus and (ii) the data packet transmitted from the radio access network control apparatus to the another radio access network control apparatus, from the wireless data received from the radio access network control apparatus to the wireless data obtained from the transformation, as the wireless data to be transmitted to the portable terminal;

receiving a data packet at the another radio access network control apparatus from the core network;

acquiring, at the another radio access network control apparatus, packet sequence information from the data packet received from the radio access network control apparatus and the data packet received from the core network; and switching at the another radio access network control apparatus, based on the acquired packet sequence information, from the data packet received from the radio access network control apparatus to the data packet received from the core network with synchronizing both data packets, as the data packet to be used in the transformation.

2. The radio access network control method according to claim 1, further comprising the step of transmitting a message from the another radio access network control apparatus to a data packet gateway apparatus, wherein the message indicates that a data packet is being received from the radio access network control apparatus.

3. The radio access network control method according to claim 1, further comprising the step of stopping transmission of the data packet from the radio access network control apparatus to the another radio access network control apparatus, after the another radio access network control apparatus has started transmitting the wireless data to the portable terminal using the data packet from the core network.

4. A radio access network control system comprising a radio access network control apparatus for transforming a data packet received from a core network to a wireless data and transmitting the wireless data to a portable terminal, and the portable terminal for receiving the wireless data from the radio access network control apparatus, wherein:

when the portable terminal which is receiving the wireless data from radio access network control apparatus enters into an area in which the portable terminal can communicate with another radio access network control apparatus being different from the radio access network control apparatus, the radio access network control apparatus transmits the wireless data transformed by the radio access network control apparatus to the another radio access network control apparatus, the another radio access network control apparatus transmits the data received from the radio access network control apparatus to the portable terminal, the radio access network control apparatus transmits the data packet received from the core network to the another radio access network control apparatus, the radio access network control apparatus identifies a correspondence between (i) the wireless data transmitted from the radio access network control apparatus to the another radio access network control apparatus and (ii) the data packet transmitted from the radio access network control apparatus to the another radio access network control apparatus, the another radio access network control apparatus transforms the data packet received from the radio access network control apparatus to the wireless data, the another radio access network control apparatus switches, based on the identified correspondence between (i) the wireless data transmitted from the radio access network control apparatus to the another radio access network control apparatus and (ii) the data packet transmitted from the radio access network control apparatus to the another radio access network control apparatus, from the wireless data received from the radio access network control apparatus to the wireless data obtained from the transformation, as the wireless data to be transmitted to the portable terminal, the another radio access network control apparatus receives a data packet from the core network, the another radio access network control apparatus acquires packet sequence information from the data packet received from the radio access network control apparatus and the data packet received from the core network, and the another radio access network control apparatus switches, based on the acquired packet sequence information, from the data packet received from the radio access network control apparatus to the data packet received from the core network with synchronizing both data packets, as the data packet to be used in the transformation.

5. A radio access network control system comprising a radio access network control apparatus and another radio access network control apparatus, wherein the radio access network control apparatus comprises:

means for receiving a data packet from a core network, means for transforming the data packet received from the core network to a wireless data, means for transmitting the wireless data obtained from transforming the data packet to a portable terminal, means for determining whether or not the portable terminal to which the wireless data is transmitted is in an area in which the portable terminal can communicate with the another radio access network control apparatus, means for transmitting the wireless data to the another radio access network control apparatus when it is determined that the portable terminal to which the wireless data is transmitted is in an area in which the portable terminal can communicate with the another radio access network control apparatus, means for transmitting the data packet received from the core network to the another radio access network control apparatus, and means for identifying a correspondence between (i) the wireless data transmitted to the another radio access network control apparatus and (ii) the data packet transmitted to the another radio access network control apparatus; and wherein the another radio access network control apparatus comprises:

means for transforming the data packet received from the radio access network control apparatus to the wireless data, means for switching, based on the identified correspondence between (i) the wireless data transmitted to the another radio access network control apparatus and (ii) the data packet transmitted to the another radio access network control apparatus, from the wireless data received from the radio access network control apparatus to the wireless data obtained from transforming the data packet received from the radio access network control apparatus, as the wireless data to be transmitted to the portable terminal, means for receiving a data packet from the core network, means for acquiring packet sequence information from the data packet received from the radio access network control apparatus and the data packet received from the core network, and means for switching, based on the acquired packet sequence information, from the data packet received from the radio access network control apparatus to the data packet received from the core network as the data packet to be transformed by the another radio access network control apparatus with synchronizing both data packets.

* * * * *